US008989136B2

(12) United States Patent
Hsu et al.

(10) Patent No.: US 8,989,136 B2
(45) Date of Patent: Mar. 24, 2015

(54) CONNECTION DORMANCY METHOD AND WIRELESS COMMUNICATION DEVICE AND COMPUTER READABLE RECORDING MEDIUM

(71) Applicant: HTC Corporation, Taoyuan County (TW)

(72) Inventors: Chan-Cheng Hsu, Taoyuan County (TW); Yi-Ju Sung, Taoyuan County (TW); Hsin-Kai Chen, Taoyuan County (TW); Chih-Yang Kuo, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 119 days.

(21) Appl. No.: 13/745,872

(22) Filed: Jan. 21, 2013

(65) Prior Publication Data

US 2013/0208638 A1  Aug. 15, 2013

Related U.S. Application Data

(60) Provisional application No. 61/598,352, filed on Feb. 14, 2012.

(51) Int. Cl.
*H04W 4/00* (2009.01)
*H04W 52/02* (2009.01)

(52) U.S. Cl.
CPC ................................ *H04W 52/0225* (2013.01)
USPC ........ 370/330; 370/328; 370/329; 455/127.5; 455/574

(58) Field of Classification Search
None
See application file for complete search history.

(56) References Cited

U.S. PATENT DOCUMENTS

| 7,894,375 | B2 | 2/2011 | Chaudry et al. | |
|---|---|---|---|---|
| 8,594,747 | B2* | 11/2013 | Shukla et al. | 455/573 |
| 2012/0052814 | A1* | 3/2012 | Gerber et al. | 455/67.11 |
| 2012/0236834 | A1* | 9/2012 | Ho et al. | 370/337 |
| 2013/0267213 | A1* | 10/2013 | Hsu | 455/418 |

FOREIGN PATENT DOCUMENTS

| TW | I327843 | 7/2010 |
|---|---|---|
| TW | I330968 | 9/2010 |
| TW | I334979 | 12/2010 |
| TW | I344768 | 7/2011 |
| WO | 2010149063 | 12/2010 |

OTHER PUBLICATIONS

"Office Action of Taiwan Counterpart Application", issued on Sep. 12, 2014, p. 1-p. 3.

* cited by examiner

*Primary Examiner* — Donald Mills
(74) *Attorney, Agent, or Firm* — Jianq Chyun IP Office (57) ABSTRACT

A connection dormancy method for a wireless communication device, the wireless communication device and computer readable recording medium using the same are provided. The method includes recording connection information between the wireless communication device and at least one target device, and generating at least one connection establishing time according to the connection information. The method also includes determining using either a first dormancy waiting time or a second dormancy waiting time as a default dormancy waiting time according to the at least one connection establishing time, and disconnecting a connection between the wireless communication device and the at least one target device after the connection is idled for the default dormancy waiting time.

15 Claims, 5 Drawing Sheets

CONNECTION DORMANCY METHOD AND WIRELESS COMMUNICATION DEVICE AND COMPUTER READABLE RECORDING MEDIUM

CROSS-REFERENCE TO RELATED APPLICATION

This application claims the priority benefits of U.S. provisional application Ser. No. 61/598,352, filed on Feb. 14, 2012. The entirety of the above-mentioned patent applications is hereby incorporated by reference herein and made a part of this specification.

BACKGROUND OF THE INVENTION

1. Field of the Invention

The disclosure relates to a connection dormancy method, a wireless communication device, and computer readable recording medium.

2. Description of Related Art

With recent advancement of hardware technology, the size of wireless communication device is getting smaller. Accordingly, size of power supply circuit within the wireless communication device is also getting smaller, so that the power provided by the power supply circuit is relatively reduced. Taken a Internet-enabled smart phone as an example, when the smart phone establishes connection continuously with a base station for uploading or downloading network packets, it is expected that the smart phone may have power consumption that is a couple of times more in comparing to power consumption in standby mode.

In light of the above, generally, after the smart phone establishes the connection and completes the operations of uploading or downloading network packets, the smart phone may disconnect the connection to prevent unnecessary power consumption for maintaining the connection if no other packets which requires uploading or downloading within a predetermined idle time (e.g., 30 seconds).

However, the current network environment is full of variables. For example, bandwidth of wireless network may be insufficient in areas such as rapid-transit stations or department stores, so that the smart phone may spend more time in establishing connection with the base station, even much more than time spent for transmitting the packet. At this point, if the predetermined idle time can be extended to delay the time that the smart phone disconnect the connection, the number of times and power required for re-establishing the connection may be significantly reduced. On the contrary, users may download or upload data through wireless network again after passing a long period of time in certain applications. In this case, if the predetermined idle time be reduced to disconnect the connection of the smart phone in advance, the power consumption of the smart phone may also be reduced. In other words, a fixed predetermined idle time may not adapt the current network environment having many sorts of variables effectively.

SUMMARY OF THE INVENTION

The present disclosure relates to a connection dormancy method, a wireless communication device and computer readable recording, which are adaptable for adjusting a connection dormancy to reduce power consumption and system loading.

The present disclosure provides a connection dormancy method for a wireless communication device, in which a plurality of connections were established between the wireless communication device and at least one target device, the connection dormancy method includes recording connection information between the wireless communication device and the at least one target device, and generating at least one connection establishing time according to the connection information. The connection dormancy method also includes determining using either a first dormancy waiting time or a second dormancy waiting time as a default dormancy waiting time according to the at least one connection establishing time. The connection dormancy method further includes disconnecting a connection between the wireless communication device and the at least one target device after the connection is idled for the default dormancy waiting time.

The present disclosure further provides a wireless communication device, the wireless communication device includes an antenna, a wireless communication chip, a connection module, a record module, a generation module and a decision module. The wireless communication chip is coupled to the antenna and configured to transceive at least one packet to be transmitted between the wireless communication device and at least one target device. The connection module is coupled to the wireless communication chip, and configured to establish a plurality of connections between the wireless communication device and the at least one target device, in which the plurality of connections are configured to transceive the at least one packet. The record module is coupled to the connection module and configured to record connection information between the wireless communication device and the at least one target device. The generation module is coupled to the record module and configured to generate at least one connection establishing time according to the connection information. The decision module is coupled to the generation module and the record module and configured to determine using either a first dormancy waiting time or a second dormancy waiting time as a default dormancy waiting time according to the at least one connection establishing time. In addition, the connection module disconnects a connections between the wireless communication device and the at least one target device after the connection is idled for the default dormancy waiting time.

The present disclosure further provides a computer readable recording medium stored with a plurality of program codes, after the plurality of program codes are loaded into a microprocessor unit, the microprocessor unit executes the plurality of program codes to complete the following steps. The steps include recording connection information between a wireless communication device and at least one target device, in which a plurality of connections were established between the wireless communication device and the at least one target device. The steps also include generating at least one connection establishing time according to the connection information between the wireless communication device and the at least one target device, and determining using either a first dormancy waiting time or a second dormancy waiting time as a default dormancy waiting time according to the at least one connection establishing time. The steps further include disconnecting a connection between the wireless communication device and the at least one target device after the connection is idled for the default dormancy waiting time.

Based on above, the connection dormancy method, the wireless communication device and the computer readable recording medium according to the embodiments of the present disclosure may record connection information corresponding to the plurality of connections between the wireless communication device and at least one target device, and generate one or more connection establishing time which has been used for establishing the plurality of connections according to the connection information. And, using of either a longer dormancy waiting time or a shorter dormancy waiting time as a default dormancy waiting time may be determined according to the one or more connection establishing time. Then, the connection between the wireless communication device and the at least one target device may be disconnected after the connection is idled for the default dormancy waiting time. As a result, power consumption and system loading may be effectively reduced.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

In order to prevent unnecessary power consumption and system loading for a wireless communication device to maintain a connection with a specific device, the embodiments of the present disclosure provides a connection dormancy method, which may be used to automatically adjust a dormancy waiting time before the connection is disconnected, according to previous connection information between the wireless communication device and the specific device. Take long term evolution (LTE) for example, after a dedicated channel is established between a user equipment and a base station, the present disclosure may be used to automatically adjust a dormancy waiting time of the dedicated channel before an auto-disconnection or a connection dormancy according to connection information between said two devices within a predetermined time in the past, such as a packet traffic, a connection establishing time and/or a connection interval time.

In addition, the embodiments of the present disclosure further disclose a wireless communication device implementing above-said connection dormancy method. Several exemplary embodiments of the present disclosure will be described in details in the following with reference to accompany the drawings.

First Exemplary Embodiment

Figure 1:
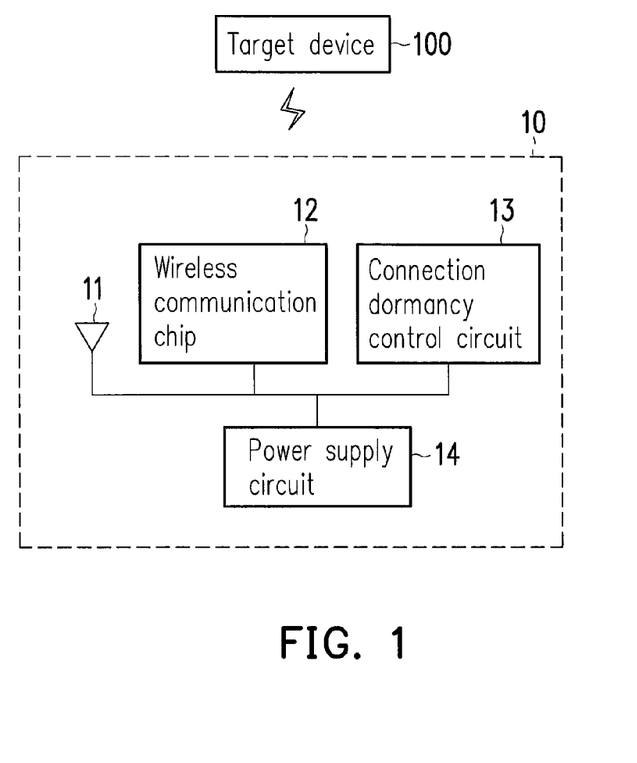
FIG. 1 is a schematic block diagram illustrating a wireless communication device according to the first exemplary embodiment of the present disclosure.

FIG. 1 is a schematic block diagram illustrating a wireless communication device according to the first exemplary embodiment of the present disclosure.

Referring to FIG. 1, a wireless communication device 10 is capable of performing a wireless communication with a target device 100. For example, the wireless communication device 10 may receive a wireless signal transmitted from the target device 100, or transmit a wireless signal to the target device 100.

In the present exemplary embodiment, the wireless communication device 10 may be various wireless communication devices, such as a cellular phone, a personal digital assistant (PDA), a smart phone, an e-book, a handheld game console or a tablet computer. In addition, the target device 100 may be, for example, a wireless base station or a mobile communication device similar to the wireless communication device 10.

The wireless communication device 10 includes an antenna 11, a wireless communication chip 12, a connection dormancy control circuit 13 and a power supply circuit 14.

The antenna 11 is configured to transcieve a wireless signal. Herein, the wireless signal may be a wireless signal compatible with wireless communication protocol formats such as second generation wireless communication technology (2G), third generation wireless communication technology (3G), global system for mobile communications (GSM) or LTE.

The wireless communication chip 12 is coupled to the antenna 11, and configured to receive a packet that other wireless communication device intended to send to the wireless communication device 10, or to transmit a packet that the wireless communication device 10 intended to send to the other wireless communication device.

The connection dormancy control circuit 13 is coupled to the wireless communication chip 12, and configured to adjust a predetermined dormancy waiting time (hereinafter, referring to as the default dormancy waiting time). More specifically, the connection dormancy control circuit 13 may disconnect a connection between the wireless communication device 10 and the target device 100 when no data packet being received by or transmitted from the wireless communication device 10, so as to reduce power consumption thereof. The following embodiments are described with reference to the drawings to further illustrate operations of the connection dormancy control circuit 13.

The power supply circuit 14 is coupled to the antenna 11, the wireless communication chip 12 and the connection dormancy control circuit 13, and configured to provide electrical power required for operating the wireless communication device 10. For example, the power supply circuit 14 may be a battery.

Figure 2:
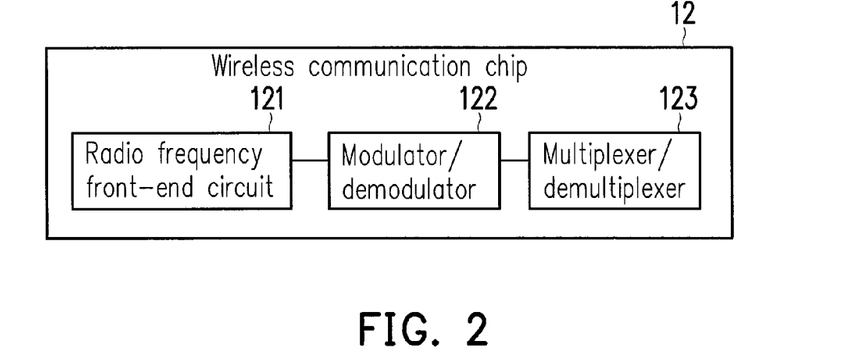
FIG. 2 is a schematic block diagram illustrating a wireless communication chip according to the first exemplary embodiment of the present disclosure.

FIG. 2 is a schematic block diagram illustrating a wireless communication chip 12 according to the first exemplary embodiment of the present disclosure.

Referring to FIG. 2, the wireless communication chip 12 includes a radio frequency front-end circuit 121, a modulator/demodulator 122 and a multiplexer/demultiplexer 123.

For instance, when the antenna 11 receives a wireless signal transmitted from other wireless communication device (hereinafter, using the target device 100 for example), the radio frequency front-end circuit 121 may convert the wireless signal into an intermediate frequency signal or an in-phase/orthogonal signal. Further, the modulator/demodulator 122 may demodulate the intermediate frequency signal or the in-phase/orthogonal signal into a transport stream. Next, the multiplexer/demultiplexer 123 may perform a demultiplexing process to the transport stream, so as to identify effective packets from the transport stream.

Additionally, in the case where the wireless communication device 10 is intended to send the packet to the target device, the multiplexer/demultiplexer 123 may first perform a multiplexing process to the packet to be sent, so as to generate a transport stream with said packet. Next, the modulator/demodulator 122 may modulate the transport stream with said packet into the intermediate frequency signal or the in-phase/orthogonal signal. Next, the radio frequency front-end circuit 121 may transmit the intermediate frequency signal or the in-phase/orthogonal signal to the target device through the antenna 11.

Figure 3:
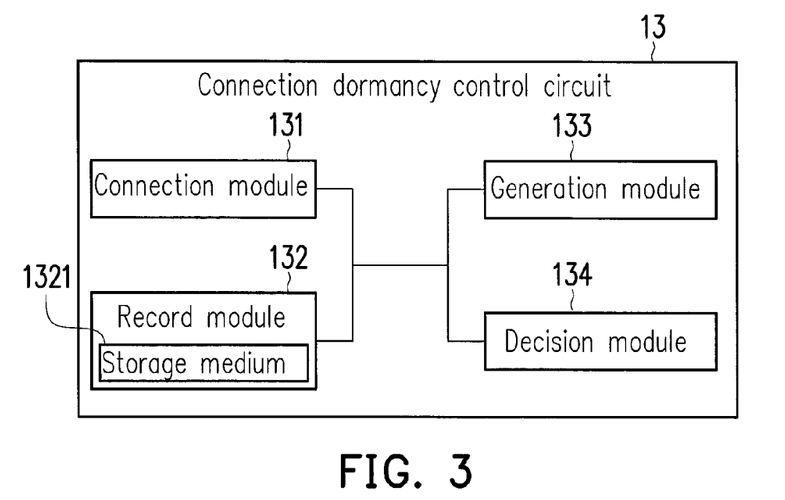
FIG. 3 is a schematic block diagram illustrating a connection dormancy control circuit according to the first exemplary embodiment of the present disclosure.

FIG. 3 is a schematic block diagram illustrating a connection dormancy control circuit according to the first exemplary embodiment of the present disclosure.

Referring to FIG. 3, the connection dormancy control circuit 13 includes a connection module 131, a record module 132, a generation module 133 and a decision module 134.

The connection module 131 is coupled to the wireless communication chip 12, and configured to establish a plurality of connections or channels (hereinafter, both are refer to as the connection) between the wireless communication device 10 and one or more target device (e.g., the target device 100 as shown in FIG. 1). Herein, the so-called connection is configured to transmit or receive packet transmitted between the wireless communication device 10 and the one or more target device 100. In other words, since the connection is required for the wireless communication device 10 to transmit the packet to the target device 100, the connection module 131 may determine whether it has the connection established with the target device 100 when the wireless communication device 10 needs to receive the packet from the target device 100 or transmit the packet to the target device 100. Once the connection is established, the wireless communication chip 12 may receive or transmit the packet. Additionally, in the case where the connection between the wireless communication device 10 and the target device 100 is yet established, the connection module 131 may first establish the connection with the target device 100, so as to allow the wireless communication chip 12 to receive or transmit the packet.

It should be noted that in the present embodiment, said connection or channel may be, for example, the dedicated channel between the wireless communication device 10 and the target device 100. Moreover, the target device mentioned hereinafter may be deemed as the target device 100 as shown in FIG. 1.

The record module 132 is coupled to the connection module 131, and configured to record connection information between the wireless communication device 10 and the one or more target device. For example, in the present exemplary embodiment, the record module 132 includes a storage medium 1321, and said connection information is stored in a connection information table of the storage medium 1321. Herein, the storage medium 1321 may be volatile memories, non-volatile memories or a combination thereof. For example, a read only memory (ROM), a dynamic random access memory (DRAM) or a static random access memory (SRAM). The storage medium 1321 may also be storage mediums such as NAND flash memory, a hard disk, an optical disk, an external storage device (e.g., a memory card or a USB drive), or a combination thereof.

It should be noted that in the present exemplary embodiment, said connection information records a time for establishing the connection between the wireless communication device 10 and any target device, an initial time for receiving or transmitting the packet, a normal connection time and a disconnection time after the connection between the wireless communication device 10 and any target device is established, a connection establishing time and a connection interval time. More specifically, said connection establishing time may substantially refer to as a time spent during a process for establishing the connection (from the beginning to the end of the process), whereas the connection interval time may be, for example, the time that no connection exists. In addition, said connection information may also include a time for practically receiving or transmitting the packet. In another exemplary embodiment of the present disclosure, the connection information to be recorded may be added or deleted according the actual requirements. The present disclosure is not limited thereto.

The generation module 133 is coupled to the record module 132, and configured to generate one or more connection establishing time required for establishing the connections between the wireless communication device 10 and the one or more target device according to the connection information between the wireless communication device 10 and one or more target device, an amount of the connection establishing times is depended on an amount of the connections recorded in the connection information or based on actual/design requirements.

For instance, by using of the connection information table 1321 stored in the storage medium 1321, the generation module 133 may obtain the connections established between the wireless communication device 10 and each target device within a predetermined time (e.g., 3 minutes) and other related connection information. As a result, the connection establishing time required for establishing each of the connections between the wireless communication device 10 and each target device may be obtained from said connection information. In addition, said predetermined time may also be replaced by a predetermined number of the connections. For example, once the number of the connections is accumulated to reach the predetermined number of the connections (e.g., 30 times), the generation module 133 may again obtain the connection establishing time required for establishing the connections. Alternatively, the generation module 133 may also obtain the connection establishing time required for establishing the connection between wireless communication device 10 and each target device directly from the connection information table stored in the storage medium 1321, the present disclosure is not limited thereto.

The decision module 134 is coupled to the record module 132 and the generation module 133, and configured to determine using either a first dormancy waiting time or a second dormancy waiting time as the default dormancy waiting time according to the connection establishing time. In which, according to the present embodiment, the first dormancy waiting time is, for example, shorter than the second dormancy waiting time.

It should be noted that, the first dormancy waiting time and the second dormancy waiting time are not intended to limit the present disclosure. In other words, for implementing purpose of the present disclosure, flexibilities in designing and implementing of the present disclosure may be increased when having more cases of longer dormancy waiting times or shorter dormancy waiting times.

It should be noted that, said default dormancy waiting time is used for the connection module 131 of the wireless communication device 10 to disconnect the connection between the wireless communication device 10 and the one or more target device after the connection between the wireless communication device 10 and the one or more target device is idled for the default dormancy waiting time (i.e., no packet is received or transmitted through the connection within the default dormancy waiting time), so that the wireless communication device 10 may be in a power-saving state similar to the connection dormancy. Once the wireless communication device 10 may efficiently adjust the default dormancy waiting time, power consumption and system loading required for the wireless communication device 10 to maintain and/or establish the connection may also be reduced, accordingly.

In other words, in the present exemplary embodiment, the generation module 133 may generate each one of or an average of the connection establishing times for the connections according to the connection information between the wireless communication device 10 and the one or more target device. Next, the decision module 134 may determine using either the first dormancy waiting time or the second dormancy waiting time as the default dormancy waiting time according to each one of or the average of the connection establishing times for the connections.

For example, once the decision module 134 determines that a plurality of connection establishing times (or the average of the connection establishing times) generated by the generation module 133 are shorter than or equal to a predetermined connection establishing time threshold value, this indicates that network bandwidth is sufficient or system loading is relatively lower at the time, so that the connection module 131 may quickly establish the connection with the target device. In this case, if a shorter dormancy waiting time (e.g., the first dormancy waiting time) is used as the default dormancy waiting time, the connection may be disconnected immediately after the default dormancy waiting time, so as to reduce power consumption for maintaining the connection during the dormancy waiting time. Further, the next time when a process of establishing the connection is needed, the connection module 131 may quickly complete the process of establishing the connection.

For another example, once the decision module 134 determines that the plurality of connection establishing times (or the average connection establishing time) is longer than the predetermined connection establishing time threshold value, this indicates that that network bandwidth is insufficient or system loading is relatively higher at the time, so that a time required for establishing the connection may be relatively longer. In this case, if the same shorter dormancy waiting time (e.g., the first dormancy waiting time) as described above is used as the default dormancy waiting time, it may be required to establish and disconnect connections more frequently, so that the time spent in establishing connection may be longer than the time actually spent for transmitting the packet. Base on above, if a longer dormancy waiting time (e.g., the second dormancy waiting time) is used as the default dormancy waiting time, time and power consumption for re-establishing the connection may both be significantly reduced.

Overall, advantage for using the shorter dormancy waiting time (e.g., the first dormancy waiting time) lies where the connection may quickly be disconnected so that the wireless communication device may be in a connection dormancy state when there is no packet required for transmission, so as to prevent unnecessary power consumption. Therefore, in the case where network bandwidth is sufficient or system loading is relatively lower, it is more preferable that the wireless communication device uses the shorter dormancy waiting time (e.g., the first dormancy waiting time) as the default dormancy waiting time. On the other hand, advantage for using the longer dormancy waiting time (e.g., the second dormancy waiting time) lies where the connections are not required to be established and disconnected repeatedly. Therefore, in the case where network bandwidth is insufficient or system loading is relatively higher, it is more preferable that the wireless communication device uses the longer dormancy waiting time (e.g., the second dormancy waiting time) as the default dormancy waiting time.

However, the present disclosure is not limited to the description above. In the present exemplary embodiment, the generation module 133 may also generate one or more connection interval time for the connection between the wireless communication device 10 and the one and more target device according to the connection information between the wireless communication device 10 and the one and more target device, an amount of the connection interval times is depended on an amount of the connections recorded in the connection information or based on actual/design requirements. In particular, according to the present exemplary embodiment, the connection interval time may be, for example, the time that no connection exists. Next, the decision module 134 may determine using either the first dormancy waiting time or the second dormancy waiting time as the default dormancy waiting time according to the connection establishing time and the connection interval time.

For instance, take the plurality of connections previously established by the wireless communication device 10 within a predetermined time or based on a predetermined number of connections for example, power consumption and system loading for the wireless communication device 10 to maintain the connections are respectively started from establishing of the connections and stopped until disconnecting or terminating of the connections. Therefore, in the case where a connection maintaining time is defined as a time from establishing of the connection until disconnecting of the connection, once the connection interval time between the connection maintaining times of the connections being too long, this indicates that the network packet flow at the time is not busy, such that it is more preferable to use the shorter dormancy waiting time (e.g., the first dormancy waiting time) as the default dormancy waiting time. On the contrary, once the connection interval time between the connection maintaining times of the connections being too short, this indicates that the network packet flow at the time is busy, such that unnecessary power consumption and system loading may be prevented by using the longer dormancy waiting time (e.g., the second dormancy waiting time) as the default dormancy waiting time to avoid the wireless communication device 10 from establishing and disconnecting the connections repeatedly.

Figure 4:
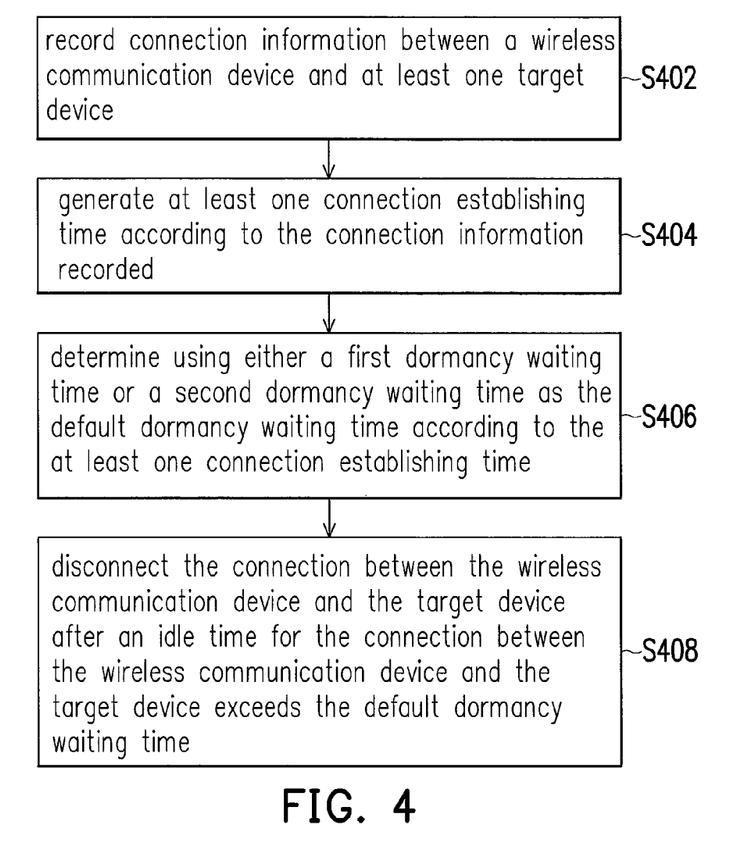
FIG. 4 is a flowchart illustrating a connection dormancy method according to the first exemplary embodiment of the present disclosure.

FIG. 4 is a flowchart illustrating a connection dormancy method according to the first exemplary embodiment of the present disclosure.

Referring to FIG. 4, it is assumed that a plurality of connections were established between the connection module 131 and one or more target device (e.g., the target device 100). In step S402, the record module 132 records connection information between a wireless communication device 10 and the one or more target device. For example, the connection information is stored in a connection information table in the storage medium 1321.

Next, in step S404, the generation module 133 may generate one or more connection establishing time according to the connection information between the wireless communication device 10 and the one or more target device, an amount of the connection establishing times is depended on an amount of the connections recorded in the connection information or based on actual/design requirements. Then, in step S406, the decision module 134 may determine using either a first dormancy waiting time or a second dormancy waiting time as the default dormancy waiting time according to the one ore more connection establishing time. In the present exemplary embodiment, the first dormancy waiting time is, for example, shorter than the second dormancy waiting time.

Moreover, according to the present exemplary embodiment, in the step S404, the generation module 133 may also generate one or more connection interval time according to the connection information between the wireless communication device 10 and the one or more target device. And, in step S406, the decision module 134 may determine using either the first dormancy waiting time or the second dormancy waiting time as the default dormancy waiting time according to the one or more connection establishing time and the one or more connection interval time generated by the generation module 133.

More specifically, the one and more connection establishing time and the one or more connection interval time may be implemented by respectively calculating an average value thereto, and using of either the first dormancy waiting time or the second dormancy waiting time as the default dormancy waiting time may be determined according to an average of the one or more connection establishing time and/or an average of the one or more connection interval time, the invention is not limited thereto.

Further, in step S408, the connection module 131 disconnects the connection between the wireless communication device 10 and the one or more target device (e.g., the target device 100) after an idle time for the connection between the wireless communication device 10 and one or more target exceeds the default dormancy waiting time.

Second Exemplary Embodiment

The hardware structure of the second exemplary embodiment is substantially the same to the hardware structure used in the first exemplary embodiment, their difference lies where: In the second exemplary embodiment, the wireless communication device may determine using either the longer dormancy waiting time or the shorter dormancy waiting time as the default dormancy waiting time based on a total connection time corresponding to dormancy waiting times with different lengths.

Figure 5:
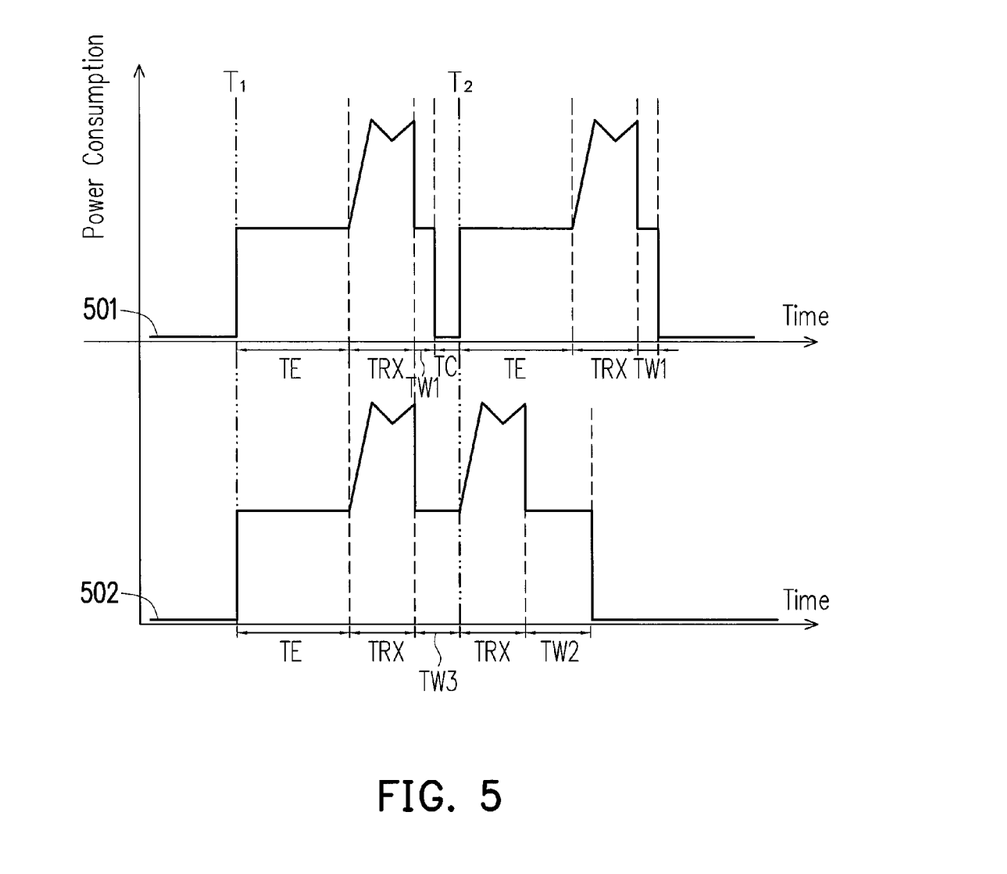
FIG. 5 is a schematic diagram illustrating a calculation of a total connection time according to the second exemplary embodiment of the present disclosure.

FIG. 5 is a schematic diagram illustrating a calculation of a total connection time according to the second exemplary embodiment of the present disclosure.

Referring to FIG. 5, in which the horizontal axis represents time (millisecond) and the vertical axis represents power consumption (millivolt or milliampere). A power consumption curve 501 in FIG. 5 is simulated by the generation module 133 according to the connection information, where the power consumption curve 501 is used to represent power consumption required for transceiving at least one packet between the wireless communication device 10 and the one or more target device (e.g., the target device 100) based on the first dormancy waiting time as the default dormancy waiting time. A power consumption curve 502 in FIG. 5 is simulated by the generation module 133 according to the connection information, where the power consumption curve 502 is used to represent power consumption required for transceiving at least one packet between the wireless communication device 10 and the one or more target device (e.g., the target device 100) based on the second dormancy waiting time as the default dormancy waiting time.

First, take the power consumption curve 501 which uses the first dormancy waiting time as the default dormancy waiting time for example, it is assumed that the wireless communication device 10 is informed to receive a first packet from the target device (e.g., the target device 100) or transmit a first packet to the target device at the first time T1. In this case, the connection module 131 immediately determines that there is no connection available, and starts establishing the connection with the target device. After a connection establishing time TE, the connection module 131 informs that establishing of the connection with the target device is completed, so that the wireless communication chip 12 may start a process of transceiving the first packet. Next, the wireless communication chip 12 completes the process of transceiving the first packet after a required time TRX for transceiving the first packet. Next, the connection module 131 disconnects the connection with the target device after idling for a first dormancy waiting time TW1.

Later, after a connection disconnecting time (or the connection dormancy time) TC, the wireless communication device 10 is informed to transceive a second packet at the second time T2. In this case, the connection module 131 immediately determines that there is no connection available, and starts to establishing the connection with the target device again. Similarly, when the connection module 131 completes the process of establishing the connection with the target device after the connection establishing time TE, and after the required time TRX for transceiving the second packet, the wireless communication chip 12 may complete a process of transceiving the second packet. Next, the connection module 131 disconnects the connection with the target device after idling for the first dormancy waiting time TW1.

Based on above, from viewpoint of the power consumption curve 501, a first total connection time (including the time for establishing the connection) may be represented by the following formula (1-1):

$$TE \text{ (the connection establishing time)} + TRX \text{ (the time required for transceiving the packet)} + TW1 \text{ (the first dormancy waiting time)} + TE + TRX + TW1 = TE \times 2 + TRX \times 2 + TW1 \times 2 \quad (1\text{-}1)$$

On the other hand, take the power consumption curve 502 which uses the second dormancy waiting time as the default dormancy waiting time for example, it is assumed that the wireless communication device 10 is informed to receive a first packet from the target device or transmit a first packet to the target device at the first time T1. In this case, the connection module 131 immediately determines that there is no connection available, and starts establishing the connection with the target device. After the connection establishing time TE, the connection module 131 informs that the connection with the target device is completed, so that the wireless communication chip 12 may start to transceive the first packet. Next, the wireless communication chip 12 completes the process of transceiving the first packet after the required time TRX for transceiving the first packet.

More specifically, since the second dormancy waiting time is longer than the first dormancy waiting time, the connection module 131 does not disconnect the connection with the target device after the wireless communication chip 12 completed the process of transceiving the first packet (which is different from the power consumption curve 501). On the contrary, it is assumed that in FIG. 5, TW2 represents the second dormancy waiting time, and the wireless communication chip 12 is informed to transceive a second packet at the second time T2 after the wireless communication chip 12 is idled for a portion of the second dormancy waiting time TW2 (i.e., a waiting time TW3). In this case, the wireless communication chip transceives the second packet to the target device by directly using the connection which is already established. Next, the wireless communication chip 12 completes the process of transceiving the second packet after the required time TRX for transceiving the packet. Next, the connection module 131 disconnects the connection with the target device after idling for the second dormancy waiting time TW2.

Based on above, from viewpoint of the power consumption curve 502, a second total connection time (including the time for establishing the connection) may be represented by the following formula (1-2):

$$TE \text{ (the connection establishing time)} + TRX \text{ (the time required for transceiving the packet)} + TW3 \text{ (the portion of the second dormancy waiting time)} + TRX + TW2 \text{ (the second dormancy waiting time)}$$
$$= TE + TRX \times 2 + TW3 + TW2 \quad (1\text{-}2)$$

Based on above, the first total connection time and the second total connection time may be calculated quickly by the generation module 133 according to formula (1-1) and formula (1-2).

It should be noted that, although it is illustrated using the total connection time for transceiving two packets in FIG. 5, the invention is not limited thereto. Various dormancy waiting times and/or various numbers of times for transceiving the packets may also be used for calculating the corresponding total connection time respectively, and the dormancy waiting time corresponding to the shortest total connection time be calculated may be used as the default dormancy waiting time.

Figure 6:
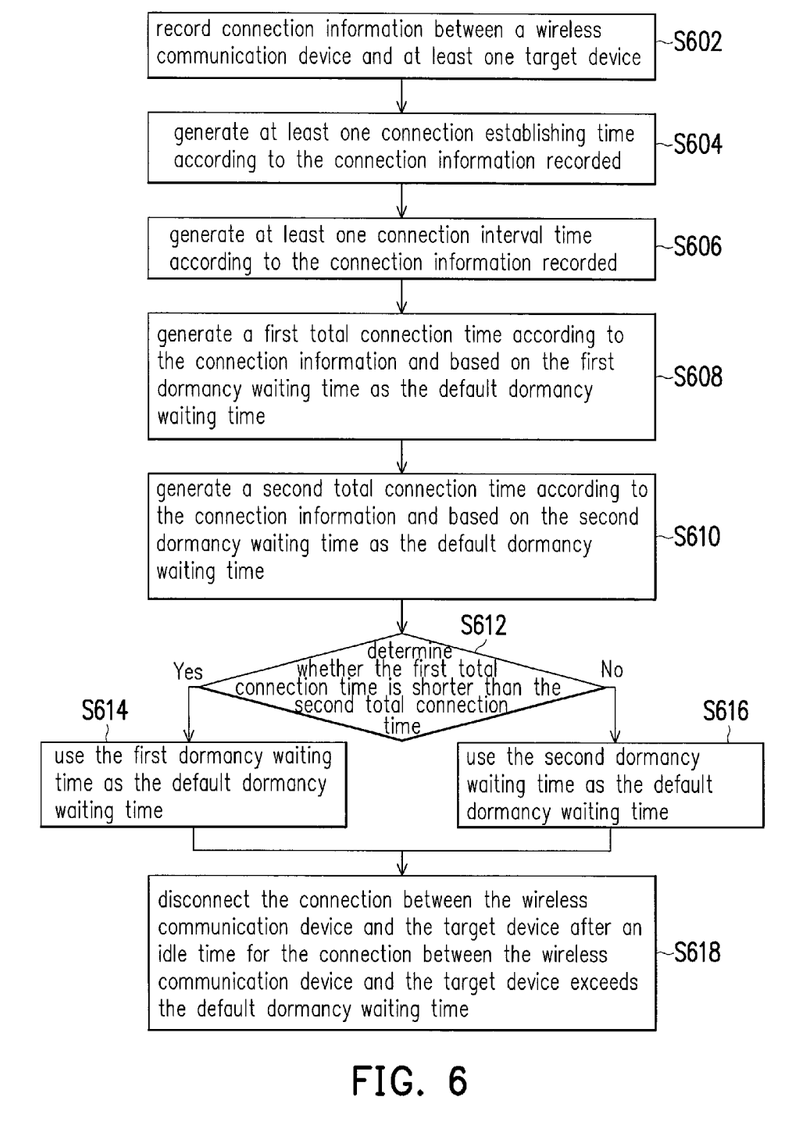
FIG. 6 is a flowchart illustrating a connection dormancy method according to the second exemplary embodiment of the present disclosure.

FIG. 6 is a flowchart illustrating a connection dormancy method according to the second exemplary embodiment of the present disclosure:

Referring to FIG. 6, it is assumed that a plurality of connections were established between the connection module 131 and the one or more target device (e.g., the target device 100). In step S602, the record module 132 records connection information between the wireless communication device 10 and the one or more target device.

Next in step S604, the generation module 133 may generate one or more connection establishing time required for the connection between the wireless communication device 10 and the one and more target device according to the connection information between the wireless communication device 10 and the one or more target device. Additionally in the step S606, the generation module 133 may generate one or more connection interval time according to the wireless communication device 10 and the one or more target device. In particular, according to the present exemplary embodiment, the connection interval time may be, for example, the time that no connection exists. It should be noted that, priority for executing step S604 and step S606 is not particularly limited in the present exemplary embodiment.

Next in step S608, the generation module 133 generates a first total connection time according to the connection information, wherein the first total connection time is required for transceiving at least one packet between the wireless communication device 10 and the at least one target device (e.g., the target device 100) based on the first dormancy waiting time as the default dormancy waiting time. Next in step S610, the generation module 133 generates a second total connection time according to the connection information, wherein the second total connection time is required for transceiving at least one packet between the wireless communication device 10 and the at least one target device (e.g., the target device 100) based on the second dormancy waiting time as the default dormancy waiting time. It should be noted that, priority for executing step S608 and step S610 and the number of times for transceiving the packet are not particularly limited in the present exemplary embodiment.

Next in step S612, the decision module 134 further determines using either the first dormancy waiting time or the second dormancy waiting time as the default dormancy waiting time according to the first total connection time and the second total connection time. For instance, the decision module 134 may determine whether the first total connection time is shorter than the second total connection time. In the case where the first total connection time is shorter than the second total connection time, this indicates that the wireless communication device 10 may have a lower power consumption when using the first dormancy waiting time instead of the second dormancy waiting time. Therefore, in the following step S614, the decision module 134 uses the first dormancy waiting time as the default dormancy waiting time. Alternatively, in the case where the first total connection time is not shorter than the second total connection time, this indicates that the wireless communication device 10 may have a lower or an equal power consumption when using the second dormancy waiting time instead the first dormancy waiting time. Therefore, in the following step S616, the decision module 134 uses the second dormancy waiting time as the default dormancy waiting time.

Further in step S618, the connection module 131 disconnects the connection between the wireless communication device 10 and the one or more target device after an idle time for the connection between the wireless communication device 10 and the one or more target device exceeds the default dormancy waiting time.

Third Exemplary Embodiment

The hardware structure of the third exemplary embodiment is substantially the same to the hardware structure used in the first exemplary embodiment, their difference lies where: In the third exemplary embodiment, the wireless communication device may be configured with a plurality of threshold values, the longer dormancy waiting time or the shorter dormancy waiting time may be used as the default dormancy waiting time according to the connection establishing time, the connection interval time and threshold values respectively corresponding to the connection establishing time and the connection interval time. Additionally, in the present exemplary embodiment, it is also illustrated using the first dormancy waiting time being shorter than the second dormancy waiting time.

Figure 7:
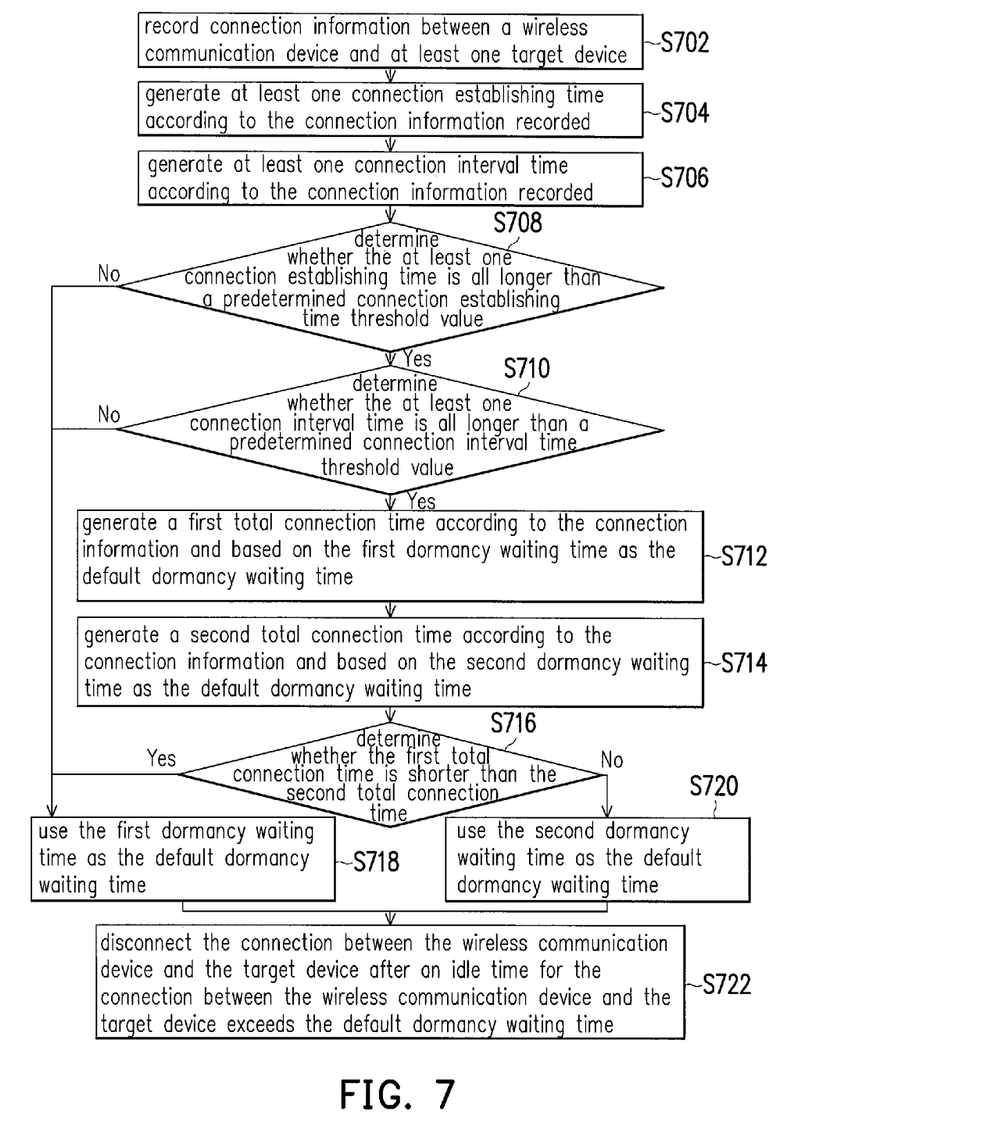
FIG. 7 is a flowchart illustrating a connection dormancy method according to the third exemplary embodiment of the present disclosure.

FIG. 7 is a flowchart illustrating a connection dormancy method according to the third exemplary embodiment of the present disclosure.

Referring to FIG. 7, it is assumed that a plurality of connections between the wireless communication device 10 and one or more target device (e.g., the target device 100) were established by the connection module 131. In step S702, the record module 132 records connection information between the wireless communication device 10 and the one or more target device.

Next in step S704, the generation module 133 may generate one or more connection establishing time required for the connection between the wireless communication device 10 and the one and more target device according to the connection information between the wireless communication device 10 and the one or more target device. Additionally in the step S704, the generation module 133 may generate one or more connection interval time for the connections according to the wireless communication device 10 and the one or more target device. In particular, according to the present exemplary embodiment, the connection interval time may be, for example, the time that no connection exists. It should be noted that, priority for executing step S704 and step S706 is not particularly limited in the present exemplary embodiment.

Next in step S708, the decision module 134 may determine whether said one or more connection establishing time is all longer than a predetermined connection establishing time threshold value, or the ratio of said one or more connection establishing time being longer than a predetermined connection establishing time threshold value is relatively higher. In the case where said one or more connection establishing time is not all longer than the predetermined connection establishing time threshold value, or the ratio of the said one or more connection establishing time being shorter than the predetermined connection establishing time threshold value is relatively higher, after step S708 is completed, the decision module 134 proceeds to execute step S718 and uses the first dormancy waiting time as the default dormancy waiting time.

Moreover, in step S708, in the case where the decision module 134 determines that said one or more connection establishing time is all longer than a predetermined connection establishing time threshold value, or the ratio of said one or more connection establishing time being longer than the predetermined connection establishing time threshold is relatively higher, the decision module 134 proceeds to execute step S710 and determines whether said one or more connection interval time is all shorter than a predetermined connection interval time threshold value, or the ratio of said one or more connection interval time being shorter than the predetermined connection interval time threshold value is relatively higher. In the case where said one or more connection interval time is not all longer than the predetermined connection interval time threshold value, or the ratio of the said one or more connection interval time being shorter than the predetermined connection interval time threshold value is relatively higher, after step S710 is completed, the decision module 134 proceeds to execute step S718 and uses the first decision waiting time as the default dormancy waiting time.

On the other hand, in step S710, in the case where the decision module 134 determines that said one or more connection interval time is all shorter than a predetermined connection interval time threshold value, or the ratio of said one or more connection interval time being shorter than the predetermined connection interval time threshold value is relatively higher, step S712 is executed after step S710 is completed. It should be noted that, priority for executing step S708 and step S710 is not particularly limited in the present exemplary embodiment.

More specifically, the one and more connection establishing time and the one or more connection interval time may be implemented by respectively calculating an average value thereto, and using of either the first dormancy waiting time or the second dormancy waiting time as the default dormancy waiting time may be determined according to an average of the one or more connection establishing time and/or an average of the one or more connection interval time, the invention is not limited thereto. For example, in step S708, in the case where the average of connection establishing time is longer than the predetermined connection establishing time threshold value, step S710 is then executed, and the following steps (such as step S710) are executed as the same method above.

Next in step S712, the generation module 133 generates a first total connection time according to the connection information, wherein the first total connection is required for transceiving at least one packet between the wireless communication device 10 and the at least one target device (e.g., the target device 100) based on the first dormancy waiting time as the default dormancy waiting time. Next in step S714, the generation module 133 generates a second total connection, time according to the connection information, wherein the second total connection is required for transceiving at least one packet between the wireless communication device 10 and the at least one target device (e.g., the target device 100) based on the second dormancy waiting time as the default dormancy waiting time. It should be noted that, priority for executing step S712 and step S714 and the number of times for transceiving the packet are not particularly limited in the present exemplary embodiment.

Next, the decision module 134 may further determine using either the first dormancy waiting time or the second dormancy waiting time as the default dormancy waiting time according to the first total connection time and the second total connection time. For instance, in step S716, the decision module 134 may determine whether the first total connection time is shorter than the second total connection time. In the case where the first total connection time is shorter than the second total connection time, in the following step S718, the decision module 134 uses the first dormancy waiting time as the default dormancy waiting time. Moreover, in the case where the first total connection time is not shorter than the second total connection time, in the following step S720, the decision module 134 uses the second dormancy waiting time as the default dormancy waiting time.

Further in step S722, the connection module 131 disconnects the connection between the wireless communication device 10 and the one or more target device after an idle time for the connection between the wireless communication device 10 and the one or more target device exceeds the default dormancy waiting time.

It should be noted that, the connection module 131, the record module 132, the generation module 133 and the decision module 134 as mentioned in above exemplary embodiments may be, for example, hardware device composed by logical circuit elements to respectively perform the functions as mentioned above. In addition, said modules may also be implemented in forms of software programs or firmware programs stored in the hard drive or the memory of the wireless communication device 10. For example, in an exemplary embodiment, software programs or firmware programs for implementing above functions may be loaded to the processor of the wireless communication device 10 to respectively perform the functions as mentioned above.

Moreover, according the another exemplary embodiment of the present disclosure, a computer readable recording medium or a non-transitory computer readable recording medium is provided, which has basic concepts similar to the same as described in the first to the third exemplary embodiments. The computer readable recording medium or the non-transitory computer readable recording medium may be any data storage device capable of storing data. The computer readable recording medium or the non-transitory computer readable recording medium is stored with a plurality of program codes, after the plurality of program codes are loaded into a microprocessor unit, the microprocessor unit may execute the plurality of program codes to complete processes and steps as described in the first exemplary embodiment through the third exemplary embodiment. The computer readable recording medium or the non-transitory computer readable recording medium may include a read-only memory (ROM), a flash memory, a CD-ROM, a magnetic tape, a floppy disk and an optical data storage device. The computer readable recording medium or the non-transitory computer readable recording medium may also be distributed over computer systems coupled to networks, such that the program codes may be stored and executed with a distributing method. In addition, the microprocessor may be an embedded controller or a central processing unit (CPU), however, the implementation of the present disclosure is not particularly limited thereto.

Based on above, the connection dormancy method, the wireless communication device and the computer readable recording medium according to the exemplary embodiments of the present disclosure may record connection information between the wireless communication device and at least one target device, and generate at least one connection establishing time according to the connection information. Using of either a first dormancy waiting time or a second dormancy waiting time as a default dormancy waiting time may be determined according to the at least one connection establishing time. In addition, the present disclosure may select a length of the default dormancy waiting time based on at least one connection interval time and different dormancy waiting times of the plurality of connections. Lastly, the plurality of connections between the wireless communication device and the at least one target device may be disconnected after the connection is idled for the default dormancy waiting time. As a result, power consumption and system loading may be effectively reduced.

Although the invention has been described with reference to the above embodiments, it is apparent to one of the ordinary skill in the art that modifications to the described embodiments may be made without departing from the spirit of the invention. Accordingly, the scope of the invention will be defined by the attached claims not by the above detailed descriptions.

What is claimed is:

1. A connection dormancy method for a wireless communication device, a plurality of connections were established between the wireless communication device and at least one target device, the connection dormancy method comprises:
    recording connection information between the wireless communication device and the at least one target device;
    generating at least one connection establishing time according to the connection information between the wireless communication device and the at least one target device, wherein the at least one connection establishing time is required for establishing the plurality of connections;
    generating at least one connection interval time of the plurality of connections according to the connection information between the wireless communication device and the at least one target device;
    determining using either a first dormancy waiting time or a second dormancy waiting time as a default dormancy waiting time according to the at least one connection establishing time and the at least one connection interval time, wherein the first dormancy waiting time is shorter than the second dormancy waiting time; and
    disconnecting a connection between the wireless communication device and the at least one target device after the connection is idled for the default dormancy waiting time.

2. The connection dormancy method of claim 1, wherein the step of determining using either the first dormancy waiting time or the second dormancy waiting time as the default dormancy waiting time according to the at least one connection establishing time and the at least one connection interval time, comprising:
    generating a first total connection time according to the connection information, wherein the first total connection time is required for transceiving at least one packet between the wireless communication device and the at least one target device based on the first dormancy waiting time as the default dormancy waiting time;
    generating a second total connection time according to the connection information, wherein the second total connection time is required for transceiving the at least one packet between the wireless communication device and the at least one target device based on the second dormancy waiting time as the default dormancy waiting time; and
    determining using either the first dormancy waiting time or the second dormancy waiting time as the default dormancy waiting time according to the first total connection time and the second total connection time.

3. The connection dormancy method of claim 1, wherein the step of determining using either the first dormancy waiting time or the second dormancy waiting time as the default dormancy waiting time according to the at least one connection establishing time and the at least one connection interval time, comprising:
    determining whether the at least one connection establishing time is longer than a connection establishing time threshold value; and
    using the first dormancy waiting time as the default dormancy waiting time when the at least one connection establishing time is not longer than the connection establishing time threshold value.

4. The connection dormancy method of claim 3, wherein the step of determining using either the first dormancy waiting time or the second dormancy waiting time as the default dormancy waiting time according to the at least one connection establishing time and the at least one connection interval time, further comprising:
    determining whether the at least one connection interval time is shorter than a connection interval time threshold value when the at least one connection establishing time is longer than the connection establishing time threshold value; and
    using the first dormancy waiting time as the default dormancy waiting time when the at least one connection interval time is not shorter than the connection interval time threshold value.

5. The connection dormancy method of claim 4, wherein the step of determining using either the first dormancy waiting time or the second dormancy waiting time as the default dormancy waiting time according to the at least one connection establishing time and the at least one connection interval time, further comprising:
    when the at least one connection interval time is shorter than the connection interval time threshold value, generating a first total connection time according to the connection information, wherein the first total connection is required for transceiving at least one packet between the wireless communication device and the at least one target device based on the first dormancy waiting time as the default dormancy waiting time, and generating a second total connection time according to the connection information, wherein the second total connection is required for transceiving the at least one packet between the wireless communication device and the at least one target device based on the second dormancy waiting time as the default dormancy waiting time; and determining using either the first dormancy waiting time or the second dormancy waiting time as the default dormancy waiting time according to the first total connection time and the second total connection time.

6. A wireless communication device, comprising:
an antenna;
a wireless communication chip, coupled to the antenna, the wireless communication chip is configured to transceive at least one packet transmitted between the wireless communication device and at least one target device;
a connection module, coupled to the wireless communication chip, the connection module is configured to establish a plurality of connections between the wireless communication device and the at least one target device, wherein the plurality of connections are configured to transceive the at least one packet;
a record module, coupled to the connection module, the record module is configured to record connection information between the wireless communication device and the at least one target device;
a generation module, coupled to the record module, the generation module is configured to generate at least one connection establishing time according to the connection information between the wireless communication device and the at least one target device, wherein the at least one connection establishing time is required for establishing the plurality of connections, wherein the generation module further generates at least one connection interval time of the plurality of connections according to the connection information; and
a decision module, coupled to the generation module and the record module, the decision module is configured to determine using either a first dormancy waiting time or a second dormancy waiting time as a default dormancy waiting time according to the at least one connection establishing time and the at least one connection interval time wherein the first dormancy waiting time is shorter than the second dormancy waiting time,
wherein the connection module disconnects a connection between the wireless communication device and the at least one target device after the connection is idled for the default dormancy waiting time.

7. The wireless communication device of claim 6, wherein the generation module further generates a first total connection time according to the connection information, wherein the first total connection is required for transceiving the at least one packet between the wireless communication device and the at least one target device based on the first dormancy waiting time as the default dormancy waiting time, and generates a second total connection time according to the connection information, wherein the second total connection is required for transceiving the at least one packet between the wireless communication device and the at least one target device based on the second dormancy waiting time as the default dormancy waiting time,
wherein the decision module further determines using either the first dormancy waiting time or the second dormancy waiting time as the default dormancy waiting time according to the first total connection time and the second total connection time.

8. The wireless communication device of claim 6, wherein the decision module further determines whether the at least one connection establishing time is longer than a connection establishing time threshold value,
wherein the decision module uses the first dormancy waiting time as the default dormancy waiting time when the at least one connection establishing time is not longer than the connection establishing time threshold value.

9. The wireless communication device of claim 8, wherein the decision module further determines whether the at least one connection interval time is shorter than a connection interval time threshold value when the at least one connection establishing time is longer than the connection establishing time threshold value,
wherein the decision module uses the first dormancy waiting time as the default dormancy waiting time when the at least one connection interval time is not shorter than the connection interval time threshold value.

10. The wireless communication device of claim 9, wherein when the at least one connection interval time is shorter than the connection interval time threshold value, the generation module further generates a first total connection time according to the connection information, wherein the first total connection is required for transceiving the at least one packet between the wireless communication device and the at least one target device based on the first dormancy waiting time as the default dormancy waiting time, and generates a second total connection time according to the connection information, wherein the second total connection is required for transceiving the at least one packet between the wireless communication device and the at least one target device based on the second dormancy waiting time as the default dormancy waiting time,
wherein the decision module further determines using either the first dormancy waiting time or the second dormancy waiting time as the default dormancy waiting time according to the first total connection time and the second total connection time.

11. A non-transitory computer readable recording medium, storing a plurality of program codes, after the plurality of program codes are loaded into a microprocessor unit, the microprocessor unit executes the plurality of program codes to complete the following steps:
recording connection information between a wireless communication device and at least one target device, wherein a plurality of connections were established between the wireless communication device and the at least one target device;
generating at least one connection establishing time according to the connection information between the wireless communication device and the at least one target device, wherein the at least one connection establishing time is required for establishing the plurality of connections;
generating at least one connection interval time according to the connection information between the wireless communication device and the at least one target device;
determining using either a first dormancy waiting time or a second dormancy waiting time as a default dormancy waiting time according to the at least one connection establishing time and the at least one connection interval time, wherein the first dormancy waiting time is shorter than the second dormancy waiting time; and
disconnecting a connection between the wireless communication device and the at least one target device after the connection is idled for the default dormancy waiting time.

12. The non-transitory computer readable recording medium of claim 11, wherein the microprocessor unit executes the plurality of program code to further complete the following steps:
- generating a first total connection time according to the connection information, wherein the first total connection is required for transceiving at least one packet between the wireless communication device and the at least one target device based on the first dormancy waiting time as the default dormancy waiting time;
- generating a second total connection time according to the connection information, wherein the second total connection is required for transceiving the at least one packet between the wireless communication device and the at least one target device based on the second dormancy waiting time as the default dormancy waiting time; and
- determining using either the first dormancy waiting time or the second dormancy waiting time as the default dormancy waiting time according to the first total connection time and the second total connection time.

13. The non-transitory computer readable recording medium of claim 11, wherein the microprocessor unit executes the plurality of program code to further complete the following steps:
- determining whether the at least one connection establishing time is longer than a connection establishing time threshold value; and
- using the first dormancy waiting time as the default dormancy waiting time when the at least one connection establishing time is not longer than the connection establishing time threshold value.

14. The non-transitory computer readable recording medium of claim 13, wherein the microprocessor unit executes the plurality of program code to further complete the following steps:
- determining whether the at least one connection interval time is shorter than a connection interval time threshold value when the at least one connection establishing time is longer than the connection establishing time threshold value; and
- using the first dormancy waiting time as the default dormancy waiting time when the at least one connection interval time is not shorter than the connection interval time threshold value.

15. The non-transitory computer readable recording medium of claim 14, wherein the microprocessor unit executes the plurality of program code to further complete the following steps:
- when the at least one connection interval time is shorter than the connection interval time threshold value, generating a first total connection time according to the connection information, wherein the first total connection is required for transceiving at least one packet between the wireless communication device and the at least one target device based on the first dormancy waiting time as the default dormancy waiting time, and generating a second total connection time according to the connection information, wherein the second total connection is required for transceiving the at least one packet between the wireless communication device and the at least one target device based on the second dormancy waiting time as the default dormancy waiting time; and
- determining using either the first dormancy waiting time or the second dormancy waiting time as the default dormancy waiting time according to the first total connection time and the second total connection time.

* * * * *